United States Patent [19]
Tominaga et al.

[11] Patent Number: 4,556,220
[45] Date of Patent: Dec. 3, 1985

[54] SOLID GOLF BALLS

[75] Inventors: Ichiro Tominaga, Kobe; Akihiro Nakahara, Ibaraki, both of Japan

[73] Assignee: Sumitomo Rubber Industries, Ltd., Hyogo, Japan

[21] Appl. No.: 618,448

[22] Filed: Jun. 7, 1984

[30] Foreign Application Priority Data

Jun. 10, 1983 [JP] Japan .................................. 58-104667
Jun. 10, 1983 [JP] Japan .................................. 58-104668
Jun. 10, 1983 [JP] Japan .................................. 58-104669

[51] Int. Cl.$^4$ ........................ A63B 37/00; A63B 37/06
[52] U.S. Cl. .................................. 273/218; 260/998.14; 524/83; 524/84; 524/908; 525/244; 525/256; 525/259; 525/261; 525/327.5
[58] Field of Search .......................... 524/908, 83, 84; 273/218; 525/244, 256, 259, 261, 327.5; 260/998.14

[56] References Cited

U.S. PATENT DOCUMENTS

| 3,384,612 | 5/1968 | Brandt et al. | 524/908 |
| 3,992,014 | 11/1976 | Retford | 524/908 |
| 4,165,877 | 8/1979 | Miller et al. | 273/218 |
| 4,266,772 | 5/1981 | Martin et al. | 273/218 |

FOREIGN PATENT DOCUMENTS

| 707231 | 4/1965 | Canada | 524/908 |
| 57-25337 | 2/1982 | Japan | 273/218 |
| 57-78875 | 5/1982 | Japan | 273/218 |
| 1448451 | 9/1976 | United Kingdom | 273/218 |

Primary Examiner—Allan M. Lieberman
Attorney, Agent, or Firm—Birch, Stewart, Kolasch & Birch

[57] ABSTRACT

The present invention provides solid golf balls having excellent rebound performance, durability and flight carry characteristics produced from a rubber composition containing one or more agents for regulating the molecular weight of grafted chain selected from the group consisting of 2-(4-morpholinyldithio) benzothiazole, 4,4'-dithio-bis-dimorpholine, dipentamethylenethiuram tetrasulfide and derivatives thereof.

5 Claims, No Drawings

SOLID GOLF BALLS

BACKGROUND OF THE INVENTION

A solid golf ball includes one-piece golf balls comprising one constituent, two-piece golf balls comprising a solid core and a cover covering the former, and multi-layer golf balls having one or more suitable intermediate layers between the solid core and the cover. Of these solid golf balls, there are known those in which a monomer having an unsaturated bond, for example, the metallic salt of an $\alpha,\beta$-monoethylenic unsaturated carboxylic acid, has been incorporated as a co-cross-linking agent in order to improve both rebound coefficient and impact resistance. These solid golf balls themselves have fairly superior performances, but golf balls having more superior rebound coefficient and durability are required.

Hitherto, the moderate hardness (compression; compression ratio) and durability of said golf balls, as produced from the composition containing a monomer such as the metallic salt of an $\alpha,\beta$-ethylenic unsaturated carboxylic acid, have been considered to result from the fact that the monomer is grafted to the polybutadiene main chain by the action of a free radical initiator, thereby acting as a co-crosslinking agent. But, when the grafted chain produced in this co-crosslinking becomes too long, a reduction in the rebound performance of the golf ball is brought about in the same manner as in blending a polybutadiene rubber with other polymers.

The present inventors tried to give a moderate hardness and durability to solid golf balls and at the same time remarkably improve their rebound performance by regulating the length of the grafted chain produced in co-crosslinking of the foregoing $\alpha,\beta$-ethylenic unsaturated carboxylic acid, and as a result, found that one group of polysulfide type compounds has a very superior performance as an agent for regulating the molecular weight of the grafted chain. The present inventors thus completed the present invention.

SUMMARY OF THE INVENTION

The present invention provides solid golf balls produced from a rubber composition containing one or more agents for regulating the molecular weight of grafted chain selected from the group consisting of 2-(4-morpholinyldithio)benzothiazole, 4,4'-dithio-bis-dimorpholine, dipentamethylenethiuram tetrasulfide and derivatives thereof.

DETAILED EXPLANATION OF THE INVENTION

The $\alpha,\beta$-monoethylenic unsaturated carboxylic acid used in the present invention, as described for example in Japanese Patent Publication No. 19615/1980, is acrylic acid, methacrylic acid, etc., and methacrylic acid is particularly preferred. Of course, acrylic acid and methacrylic acid may be used in combination. The metallic salt of the foregoing $\alpha,\beta$-monoethylenic unsaturated carboxylic acid is the salt of a divalent metal, for example the zinc salt, calcium salt, magnesium salt, zirconium salt, etc., and the zinc salt is particularly preferred.

The amount of the foregoing agent for regulating the molecular weight of grafted chain used is about 0.1 to about 10 parts by weight, particularly preferably 0.1 to 5 parts by weight based on 100 parts by weight of the rubber component. When said amount is less than 0.1 part by weight, the effect of addition is not sufficiently displayed.

As the rubber component used in practicing the present invention, polybutadiene is used alone or in combination with a natural rubber, synthetic polyisoprene rubber or the like of not more than about 10 parcents by weight based on the rubber component. When the amount of the natural rubber or synthetic polyisoprene rubber blended is more than 10 parcents by weight, the rebound coefficient of the ball obtained markedly lowers.

To the composition for the solid golf ball of the present invention, proper amounts of a free radical initiator for polymerizing the $\alpha,\beta$ethylenic unsaturated carboxylic acid (e.g. dicumyl peroxide), an antioxidant, a filler (e.g. zinc oxide) and the like are added.

The solid golf ball obtained in the present invention may be any of one-piece golf balls, two-piece ones and multi-layer ones as described above. In either case, the golf balls obtained show markedly superior rebound performance, durability and flight carry characteristics as compared with those obtained with the monomer alone such as the metallic salt of the $\alpha,\beta$-ethylenic unsaturated carboxylic acid.

Next, the present invention will be illustrated with reference to the following examples.

EXAMPLES 1 TO 3 AND COMPARATIVE EXAMPLES 1 TO 4

The materials shown in Table 1 were kneaded on a kneading roll and pressure-molded at about 149° C. for 30 minutes into a solid core (diameter, 39 mm). The physical properties of the core obtained are shown in Table 1.

Separately from this, a blend of 100 parts by weight of an ionomer resin (Surlyn 1601; produced by Du Pont Co.) and 5 parts by weight of titanium dioxide was molded into a cover of semi-spherical shell form.

The solid core above was then wrapped with two pieces of the semi-spherical cover and pressure-molded into a two-piece golf ball having a diameter of about 41.2 mm. The flight carry of the solid golf ball obtained was measured by means of a driver (45.0 m/sec), and the result is shown in Table 1.

TABLE 1

|  |  | Example | | | Comparative example | | | |
|---|---|---|---|---|---|---|---|---|
|  |  | 1 | 2 | 3 | 1 | 2 | 3 | 4 |
| Material of core | Cis 1,4-polybutadiene[1] | 100 | 100 | 100 | 100 | 100 | 100 | 100 |
|  | Zinc acrylate | 35 | 40 | 43 | 30 | 35 | 40 | 40 |
|  | Zinc oxide | 53.1 | 52.7 | 52.3 | 54.5 | 53.7 | 52.8 | 52.7 |
|  | Antioxidant[2] | 0.5 | 0.5 | 0.5 | 0.5 | 1.2 | 1.8 | 0.5 |
|  | Dicumyl peroxide | 1.5 | 1.5 | 1.5 | 1.5 | 1.5 | 1.5 | 1.5 |
|  | 2-(4-morpholinyldithio)benzothiazole | 0.5 | 0.7 | 0.9 | — | — | — | — |
|  | Sulfur | — | — | — | — | — | — | 0.7 |
| Physical | Weight (g) | 35.30 | 35.29 | 35.28 | 35.32 | 35.32 | 35.30 | 35.20 |

TABLE 1-continued

|  |  | Example | | | Comparative example | | | |
|---|---|---|---|---|---|---|---|---|
|  |  | 1 | 2 | 3 | 1 | 2 | 3 | 4 |
| property of core | Compression[3] | 48 | 50 | 52 | 51 | 50 | 50 | 128 |
|  | Rebound coefficient index[4] | 109 | 115 | 118 | 102 | 100 | 94 | — |
|  | Durability index[5] | 102 | 105 | 109 | 100 | 100 | 106 | — |
| Flight carry of two-piece solid golf ball (m) | | 209 | 210 | 213 | 207 | 206 | 204 | — |

[1]BR-01; produced by Japan Synthetic Rubber Co., Ltd.
[2]2,2'-methylene bis(4-methyl-6-t-butylphenol); produced by American Cianamid Co., available as Antioxidant 2246.
[3]The value, as expressed in 1/100 inch, of the amount of strain obtained when a definite load was applied after giving a definite initial strain.
[4]The relative value of rebound coefficient with the rebound coefficient of the core obtained in Comparative example 2 as 100.
[5]The relative value of impact resistance, as expressed by the number of applied impacts, with the impact resistance of the core obtained in Comparative Example 1 as 100.

EXAMPLES 4 TO 6 AND COMPARATIVE EXAMPLES 5 TO 8

The materials shown in Table 2 were kneaded on a kneading roll and pressure-molded at about 149° C. for 30 minutes into a solid core (diameter, 39 mm). The physical properties of the core obtained are shown in Table 2.

Separately from this, a blend of 100 parts by weight of an ionomer resin (Surlyn 1601; produced by Du Pont Co.) and 5 parts by weight of titanium dioxide was molded into a cover of semi-spherical shell form.

The solid core above was then wrapped with two pieces of the semi-spherical cover and pressure-molded into a two-piece golf ball having a diameter of about 41.2 mm. The flight carry of the solid golf ball obtained was measured by means of a driver (45.0 m/sec), and the result is shown in Table 2.

EXAMPLE 7 TO 9 AND COMPARATIVE EXAMPLES 9 TO 12

The materials shown in Table 3 were kneaded on a kneading roll and pressure-molded at about 149° C. for 30 minutes into a solid core (diameter, 39 mm). The physical properties of the core obtained are shown in Table 3.

Separately from this, a blend of 100 parts by weight of an ionomer resin (Surlyn 1601; produced by du Pont Co.) and 5 parts by weight of titanium dioxide was molded into a cover of semi-spherical shell form.

The solid core above was then wrapped with two pieces of the semi-spherical cover and pressure-molded into a two-piece golf ball having a diameter of about 41.2 mm. The flight carry of the solid golf ball obtained was measured by means of a driver (45.0 m/sec), and the result is shown in Table 3.

TABLE 2

|  |  | Example | | | Comparative example | | | |
|---|---|---|---|---|---|---|---|---|
|  |  | 4 | 5 | 6 | 5 | 6 | 7 | 8 |
| Material of core | Cis 1,4-polybutadiene[1] | 100 | 100 | 100 | 100 | 100 | 100 | 100 |
|  | Zinc acrylate | 35 | 40 | 43 | 30 | 35 | 40 | 40 |
|  | Zinc oxide | 53.2 | 52.8 | 52.4 | 54.5 | 53.7 | 52.8 | 52.7 |
|  | Antioxidant[2] | 0.5 | 0.5 | 0.5 | 0.5 | 1.2 | 1.8 | 0.5 |
|  | Dicumyl peroxide | 1.5 | 1.5 | 1.5 | 1.5 | 1.5 | 1.5 | 1.5 |
|  | 4,4'-dithio-bis-dimorpholine | 0.4 | 0.7 | 1.0 | — | — | — | — |
|  | Sulfur | — | — | — | — | — | — | 0.7 |
| Physical property of core | Weight (g) | 35.32 | 35.31 | 35.30 | 35.32 | 35.32 | 35.30 | 35.21 |
|  | Compression[3] | 50 | 50 | 51 | 51 | 50 | 50 | 130 |
|  | Rebound coefficient index[4] | 110 | 117 | 120 | 102 | 100 | 94 | — |
|  | Durability index[5] | 101 | 104 | 108 | 100 | 102 | 105 | — |
| Flight carry of two-piece solid golf ball (m) | | 210 | 211 | 215 | 207 | 206 | 204 | — |

[1]BR-01; produced by Japan Synthetic Rubber Co., Ltd.
[2]2,2'-methylene bis(4-methyl-6-t-butylphenol); produced by American Cianamid Co., available as Antioxidant 2246.
[3]The value, as expressed in 1/100 inch, of the amount of strain obtained when a definite load was applied after giving a definite initial strain.
[4]The relative value of rebound coefficient with the rebound coefficient of the core obtained in Comparative example 6 as 100.
[5]The relative value of impact resistance, as expressed by the number of applied impacts, with the impact resistance of the core obtained in Comparative Example 5 as 100.

TABLE 3

|  |  | Example | | | Comparative example | | | |
|---|---|---|---|---|---|---|---|---|
|  |  | 7 | 8 | 9 | 9 | 10 | 11 | 12 |
| Material of core | Cis 1,4-polybutadiene[1] | 100 | 100 | 100 | 100 | 100 | 100 | 100 |
|  | Zinc acrylate | 35 | 40 | 43 | 30 | 35 | 40 | 40 |
|  | Zinc oxide | 53.1 | 52.7 | 52.2 | 54.5 | 53.7 | 52.8 | 52.7 |
|  | Antioxidant[2] | 0.5 | 0.5 | 0.5 | 0.5 | 1.2 | 1.8 | 0.5 |
|  | Dicumyl peroxide | 1.5 | 1.5 | 1.5 | 1.5 | 1.5 | 1.5 | 1.5 |
|  | Dipentamethylenethiuram tetrasulfide | 0.4 | 0.6 | 1.0 | — | — | — | — |
|  | Sulfur | — | — | — | — | — | — | 0.6 |
| Physical property of core | Weight (g) | 35.30 | 35.33 | 35.35 | 35.32 | 35.33 | 35.30 | 35.30 |
|  | Compression[3] | 49 | 50 | 51 | 50.7 | 50.0 | 50.0 | 120 |
|  | Rebound coefficient index[4] | 110 | 112 | 117 | 102 | 100 | 94 | 70 |
|  | Durability index[5] | 102 | 105 | 106 | 100 | 100 | 106 | — |

TABLE 3-continued

|  | Example | | | Comparative example | | | |
| --- | --- | --- | --- | --- | --- | --- | --- |
|  | 7 | 8 | 9 | 9 | 10 | 11 | 12 |
| Flight carry of two-piece solid golf ball (m) | 209 | 211 | 214 | 206 | 205 | 203 | — |

[1] BR-01; produced by Japan Synthetic Rubber Co., Ltd.
[2] 2,2'-methylene bis(4-methyl-6-t-butylphenol); produced by American Cianamid Co., available as Antioxidant 2246.
[3] The value, as expressed in 1/100 inch, of the amount of strain obtained when a definite load was applied after giving a definite initial strain.
[4] The relative value of rebound coefficient with the rebound coefficient of the core obtained in Comparative example 10 as 100.
[5] The relative value of impact resistance, as expressed by the number of applied impacts, with the impact resistance of the core obtained in Comparative Example 9 as 100.

What is claimed is:

1. A solid golf ball comprising a rubber component selected from the group consisting of polybutadiene and polybutadiene with up to 10% of synthetic or natural polyisoprene, an $\alpha,\beta$-monoethylenic unsaturated carboxylic acid salt of a divalent metal grafted thereto, and at least one molecular weight regulating agent selected from the group consisting of 2-(4-morpholinyldithio)benzothiazole, 4,4'-dithio-bis-dimorpholine, dipentamethyulenethiuram tetrasulfide and derivatives thereof, said regulating agent being present in an amount of about 0.1 to about 10 parts by weight based on 100 parts by weight of the rubber component.

2. The solid golf ball as described in claim 1, wherein said rubber composition contains more than 90 percents by weight of a polybutadiene rubber based on the rubber component.

3. The solid golf ball of claim 1 wherein the $\alpha,\beta$-monoethylenic unsaturated carboxylic acid is selected from the group consisting of acrylic acid, methacrylic acid and mixtures thereof.

4. The solid golf ball of claim 1 wherein the divalent metal is selected from the group consisting of zinc salt, calcium salt, magnesium salt, and zirconium salt.

5. The solid golf ball of claim 1 wherein the requesting agent is used in an amount of about 0.1 to 5 parts by weight based on 100 parts by weight of the rubber component.

* * * * *